US 6,595,496 B1

(12) United States Patent
Langlie et al.

(10) Patent No.: US 6,595,496 B1
(45) Date of Patent: Jul. 22, 2003

(54) FENCE POST ASSEMBLY, PORTABLE FENCING SYSTEM AND METHOD

(75) Inventors: Ronald H. Langlie, Ellendale, MN (US); James B. Easley, Mound, MN (US); Timothy N. Wilson, Ellendale, MN (US)

(73) Assignee: Waters Instruments, Inc., Plymouth, MN (US)

( * ) Notice: Subject to any disclaimer, the term of this patent is extended or adjusted under 35 U.S.C. 154(b) by 0 days.

(21) Appl. No.: 09/672,550

(22) Filed: Sep. 28, 2000

(51) Int. Cl.[7] .................................................. A01K 3/00
(52) U.S. Cl. ............................................. 256/1; 256/10
(58) Field of Search ............................. 256/1, 10, 46, 256/43, 44, 24, 37

(56) References Cited

U.S. PATENT DOCUMENTS

| 475,383 | A | * | 5/1892 | Cleaveland | 256/41 |
|---|---|---|---|---|---|
| 596,987 | A | * | 1/1898 | Diller | 256/41 |
| 891,448 | A | | 6/1908 | Snider | |
| 1,998,185 | A | * | 4/1935 | Broderick | 256/41 |
| 3,011,597 | A | | 12/1961 | Galloway et al. | |
| 3,698,144 | A | | 10/1972 | Stratton | |
| 3,871,142 | A | | 3/1975 | Abbott | |
| 3,917,231 | A | | 11/1975 | Fink | |
| 4,119,301 | A | * | 10/1978 | Payne | 256/41 |
| 4,593,872 | A | | 6/1986 | Svensson | |
| 4,706,941 | A | * | 11/1987 | Sherdan | 256/10 |
| 4,844,420 | A | | 7/1989 | Oster | |
| 4,863,137 | A | | 9/1989 | Cockman et al. | |
| 5,011,107 | A | | 4/1991 | Reece | |
| 5,484,137 | A | | 1/1996 | Smith | |
| 5,501,429 | A | | 3/1996 | Sakuma | |
| 5,816,946 | A | | 10/1998 | Grossman | |
| 6,375,164 | B1 | * | 4/2002 | Siegler et al. | 256/1 |
| 6,375,165 | B1 | * | 4/2002 | Sherratt et al. | 256/24 |

* cited by examiner

Primary Examiner—Lynne H. Browne
Assistant Examiner—Kenn Thompson
(74) Attorney, Agent, or Firm—Fredrikson & Byron PA

(57) ABSTRACT

A fence post assembly, as well as a fencing system and related method utilizing the fence post assembly, for forming a temporary enclosure, such as a horse corral for restraining horses. The fence post assembly is provided with an extensible and retractable fence strand, such as polytape or wire, as well as a ground anchor at one end of the post to enable the post to be anchored into the ground. The extendable and retractable fence strand is selectively positionable along the length of the post between the first and second opposite ends thereof. In addition, the fence strand can be electrically conductive to permit the enclosure to be electrified. Provision is made to maintain electrical continuity between fence strands.

1 Claim, 11 Drawing Sheets

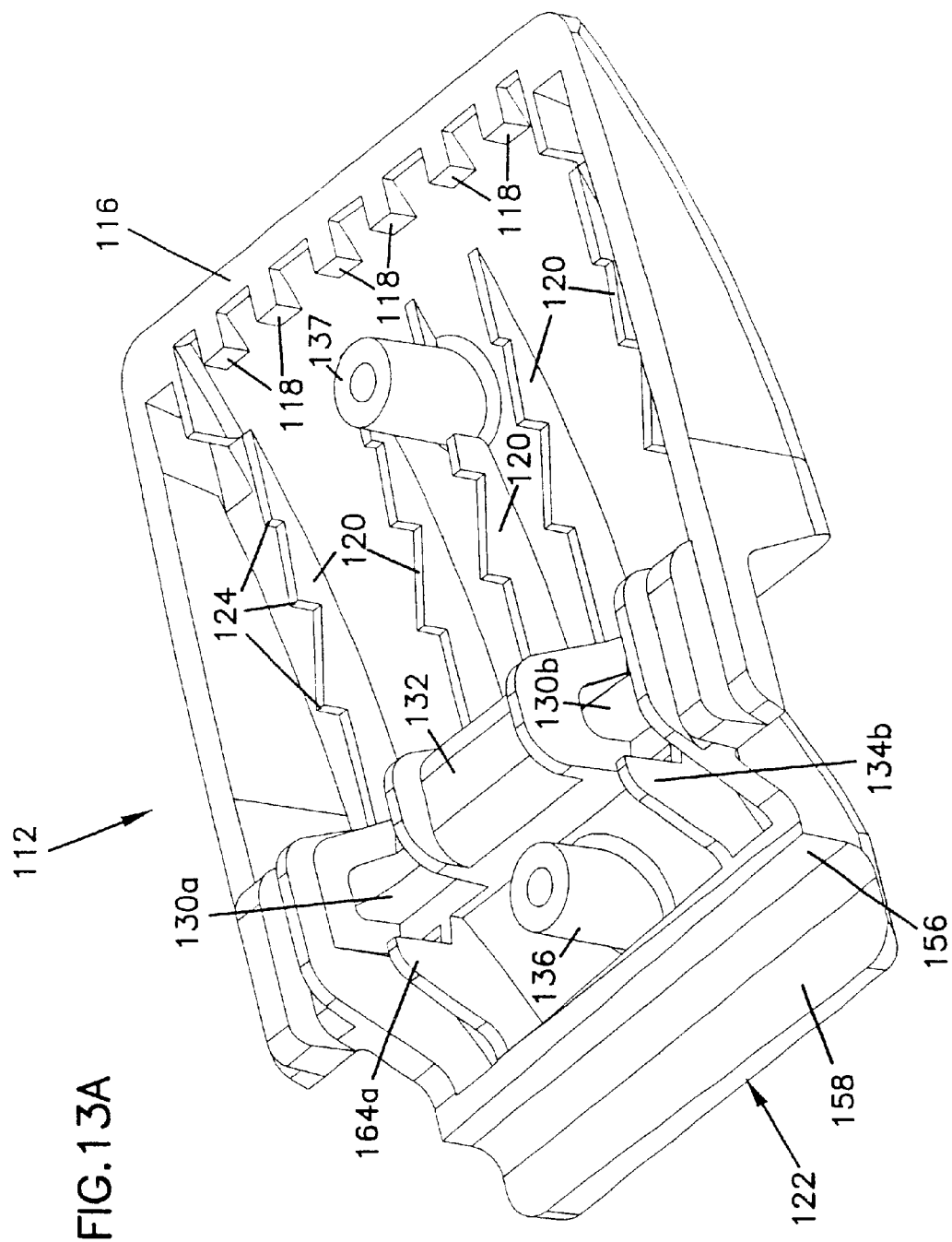

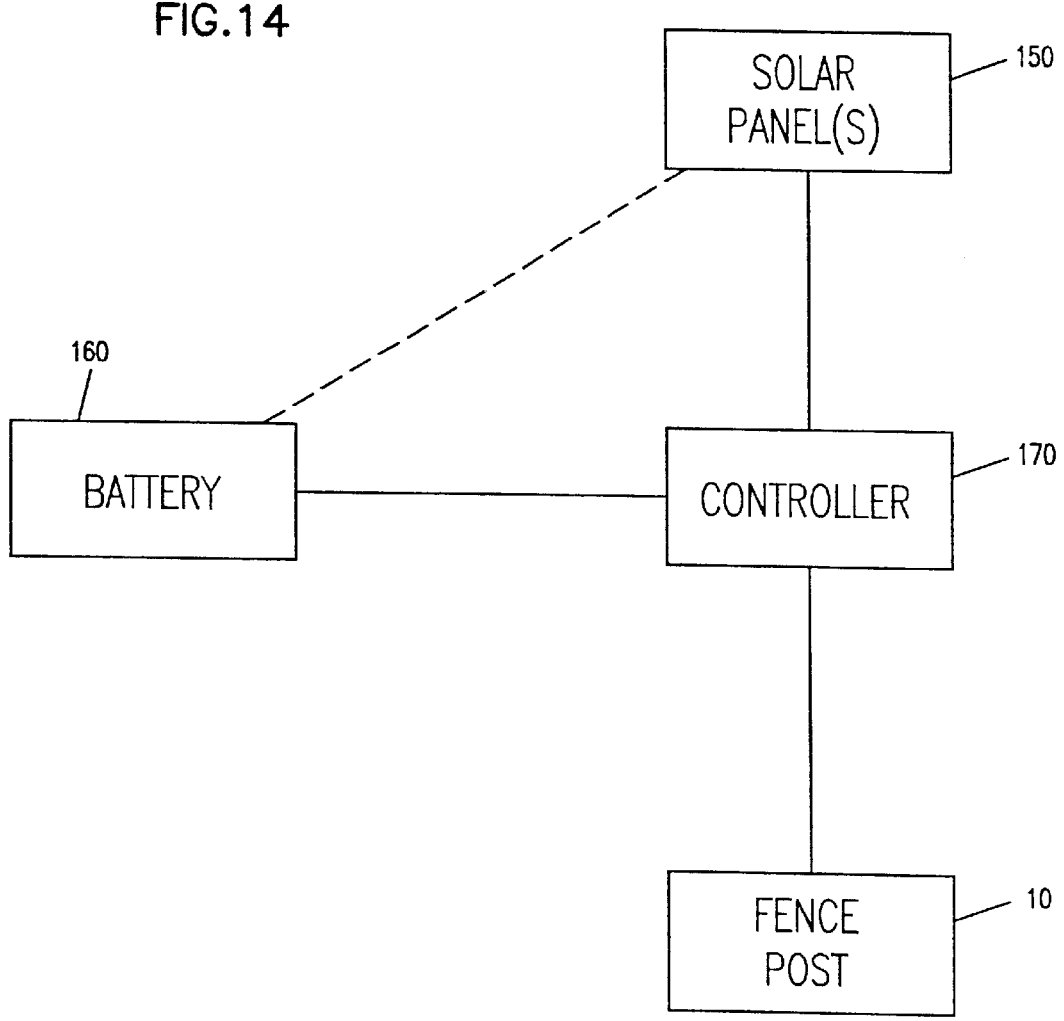

FENCE POST ASSEMBLY, PORTABLE FENCING SYSTEM AND METHOD

FIELD

The present invention relates to a fence post assembly for use in a portable fencing system and related method. The fence post assembly of the invention is particularly suited for use in forming a variety of animal enclosures, such as a portable horse corral and the like. However, the fence post assembly, fencing system and method also have utility in forming other types of enclosures or in defining other bounded areas.

BACKGROUND

Often times it is necessary to define a temporary enclosure or bounded area in a location that does not have an existing enclosure(s) or in which one or more additional enclosures are necessary. One example of a situation in which such a need arises is when one or more horses are brought to a location not having existing enclosures or where the existing enclosures are inadequate and must be supplemented by temporary enclosures. Rodeos, horse shows, and temporary training and/or grazing sites are examples of locations at which a temporary enclosure(s) may be necessary.

Previously, when a temporary enclosure was needed, such as for one or more horses, metallic fencing sections were generally hauled to the appropriate site and assembled to form an enclosure or horse corral. Typically, the fencing sections are heavy and difficult to assemble into a complete enclosure, as well as being hard to transport due to their weight and size. In addition, an enclosure made from metallic fencing can often be considered excessive when it is realized that an enclosure made from simpler components can adequately perform the intended function.

Therefore a need exists for an improved fencing system for use in forming a temporary enclosure or bounded area.

SUMMARY

The general purpose of the present invention is to provide an improved fence post assembly, as well as a fencing system and related method utilizing the improved fence post assembly, for forming a temporary enclosure, such as a horse corral for restraining horses. The fence post assembly is provided with an extensible and retractable fence strand, such as polytape or wire, as well as a ground anchor at one end of the fence post to enable the fence post to be anchored into the ground.

According to one aspect of the invention as defined in the claims, a fence post assembly is provided that comprises a fence post having first and second opposite ends, a ground anchor connected to the fence post adjacent the first end for anchoring the fence post, and a fence strand assembly connected to the fence post. The fence strand assembly includes an extendable and retractable fence strand, and the extendable and retractable fence strand is selectively positionable along the length of the fence post between the first and second opposite ends thereof.

According to another aspect of the invention as defined in the claims, a portable fencing system for forming an enclosure is provided that comprises at least one fence post assembly, with the at least one fence post assembly including: a fence post having first and second opposite ends, a ground anchor connected to the fence post adjacent the first end for anchoring the post; and a fence strand assembly connected to the post. The fence strand assembly includes an extendable and retractable fence strand, and the extendable and retractable fence strand is selectively positionable along the length of the fence post between the first and second opposite ends thereof.

In yet another aspect of the invention as defined in the claims, a method of forming an enclosure comprises providing a first fence post assembly having a fence post with first and second opposite ends, a ground anchor connected to the fence post adjacent the first end for anchoring the post; and a fence strand assembly connected to the post. The fence strand assembly includes an extendable and retractable fence strand, and the extendable and retractable fence strand is selectively positionable along the length of the post between the first and second opposite ends thereof. The method further includes anchoring the fence post to the ground, extending the fence strand a sufficient amount to at least partially form an enclosure; and positioning the fence strand along the length of the fence post to achieve the desired fence strand height.

In still another aspect of the invention, as defined in the claims, a fence strand assembly for a fence post is provided. The fence strand assembly includes a housing that includes a clamp assembly configured for releasable engagement with the fence post whereby the housing can be connected to and selectively positioned along the fence post. In addition, a fence strand material is at least partially disposed within the housing, with the fence strand material being extendable and retractable relative to the housing.

Another aspect of the invention, as defined in the claims, provides a fencing kit that comprises a plurality of fence post assemblies. Each fence post assembly includes a fence post, a ground anchor for anchoring the post, and a fence strand assembly. The fence strand assembly includes an extendable and retractable fence strand, and means for selectively positioning the fence strand along the length of the post.

These and various other advantages and features of novelty which characterize the invention are pointed out with particularity in the claims annexed hereto and forming a part hereof. However, for a better understanding of the invention, its advantages and objects obtained by its use, reference should be made to the drawings which form a further part hereof, and to the accompanying description, in which there is described a preferred embodiment of the invention.

BRIEF DESCRIPTION OF THE DRAWINGS

Referring to the drawings, wherein like numerals represent like parts throughout the several views:

FIGS. 13A and 13B illustrate the two primary parts of the gate handle of FIG. 12.

FIG. 14 schematically illustrates the power supply and control used in the electric fence system.

DETAILED DESCRIPTION

Figure 1:
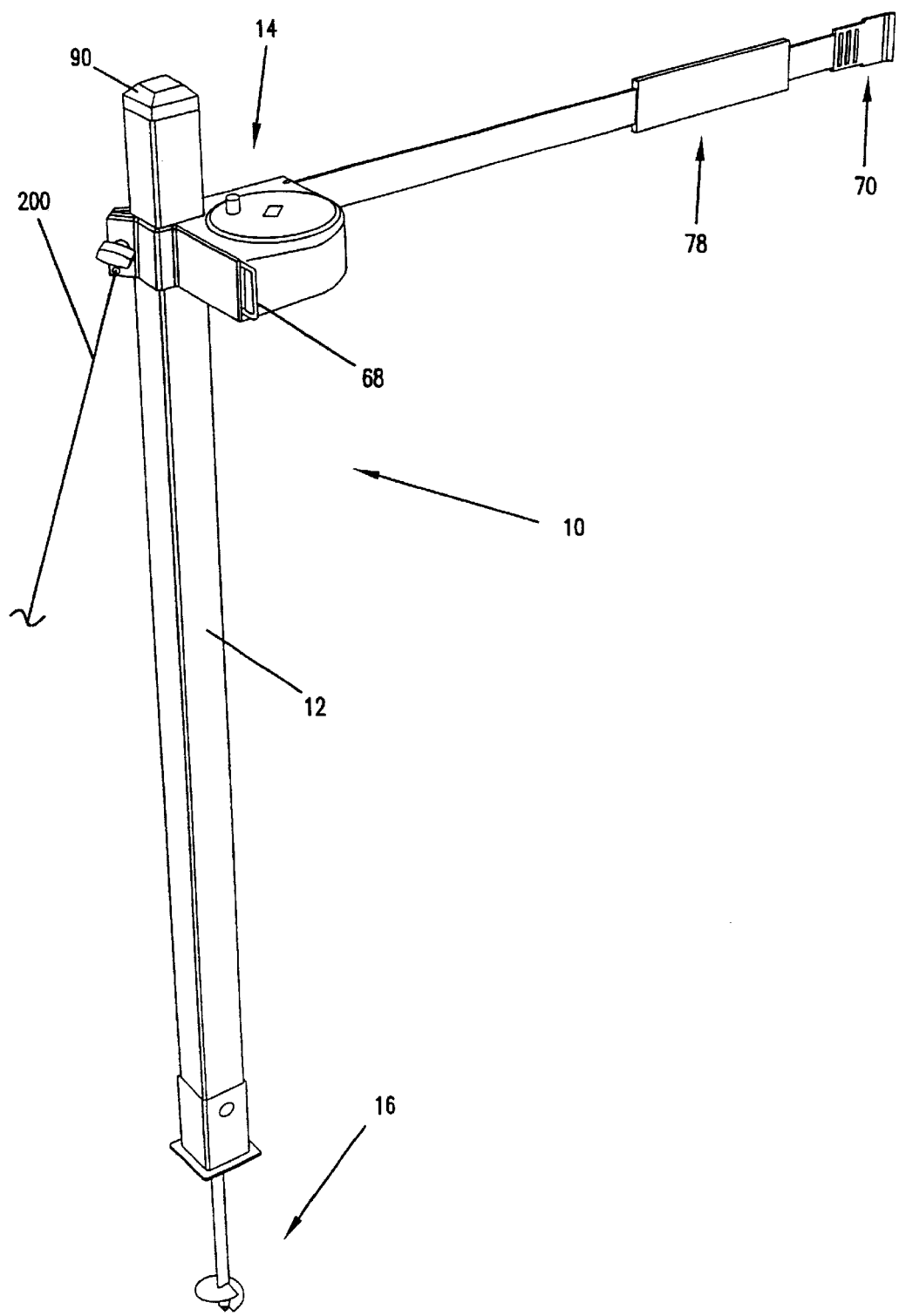
FIG. 1 illustrates a fence post assembly in accordance with the principles of the invention.

With reference to FIG. 1, a fence post assembly 10 in accordance with the principles of the present invention is illustrated. The fence post assembly 10 generally includes a fence post 12, a fence strand assembly 14 connected to the post 12 and adjustable along the length thereof, and a ground anchor 16 at one end of the post 12 to enable the post 12 to be anchored into the ground.

It is to be realized that although FIG. 1 illustrates the fence post assembly 10 as having a single fence strand assembly 14, multiple fence strand assemblies 14 can be connected to the post 12 to permit a multi-strand fence. In addition, multiple fence post assemblies 10 can be stacked together to provide a multi-strand fence. For instance, a second post 12 of a second fence post assembly 10 could be designed for securement to the end of a first post 12, such as by using removable fasteners such as screws, whereby the second post 12 is stacked on the first post 12 to increase the height of the resulting enclosure. The second fence post assembly 10 can include one or more fence strand assemblies 14, that cooperate with the one or more fence strand assemblies on the first post in defining the enclosure.

Figure 2:
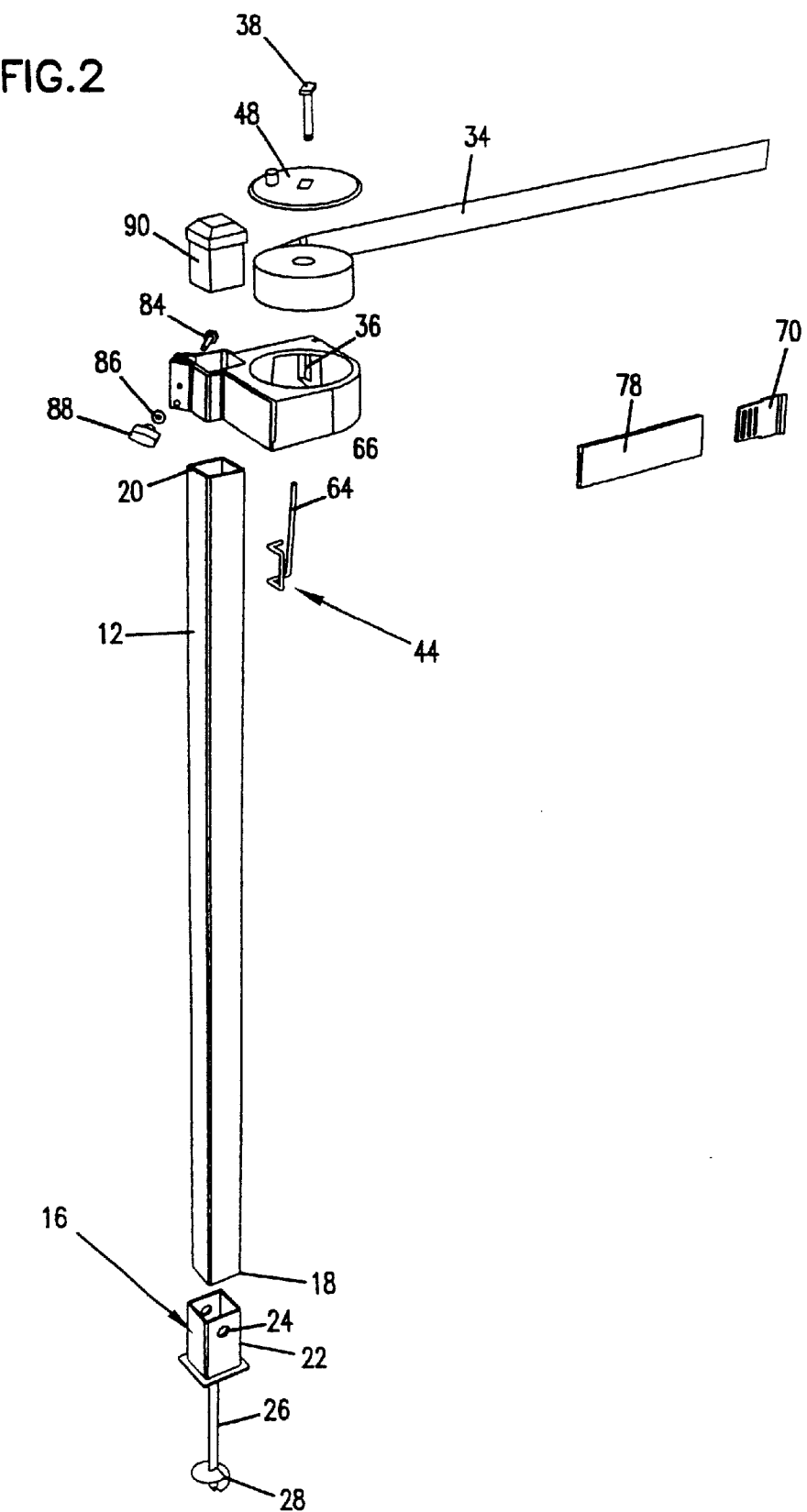
FIG. 2 is an exploded view of the components of the fence post assembly.

With continued reference to FIG. 1, as well as to FIG. 2, the post 12 has a generally elongated, hollow, rectangular shape with a first end 18 and a second end 20. The post 12 is made from suitable material, such as metal, plastic or fiberglass. The post 12 can have a cross-sectional shape other than rectangular, such as triangular or round, if desired. Further, it is also contemplated that the post 12 could be made solid rather than hollow.

Connected adjacent to the first end 18 of the post 12 is the ground anchor 16. The ground anchor 16 is preferably made of metal, although plastic could be used as well. As best shown in FIGS. 2 and 10A, the ground anchor 16 includes a sleeve 22 that fits over the post 12 adjacent the first end 18. A pin, bolt, rivet or other suitable fastener (not shown) preferably extends through holes 24 provided in the sleeve 22 and through the post 12 in order to secure the ground anchor 16 to the post 12. Extending from the bottom of the sleeve 22 is a shaft 26 with an auger 28 disposed at the bottom end of the shaft 26. The auger 28 permits the post 12 to be screwed into the ground, thereby anchoring the fence post 10 into the ground. The ground anchor 16 could also be designed to fit within the end 18 of the post 12, rather than over the end 18 of the post 12. In one implementation, a shaft 26 having a length of about 8 to about 12 inches has been found to be effective. Other shaft lengths could be used if desired.

Figure 10B:
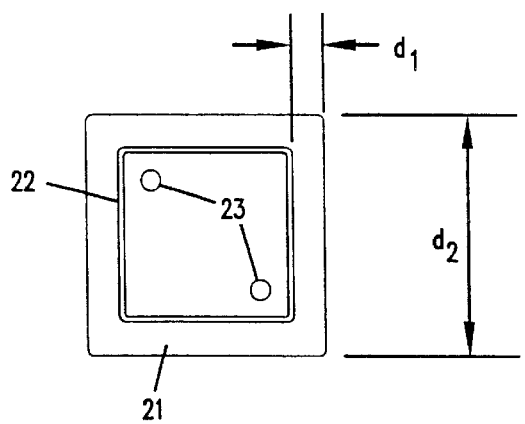
FIGS. 10A–C illustrate perspective, top and bottom views of the ground anchor.
Figure 10A:
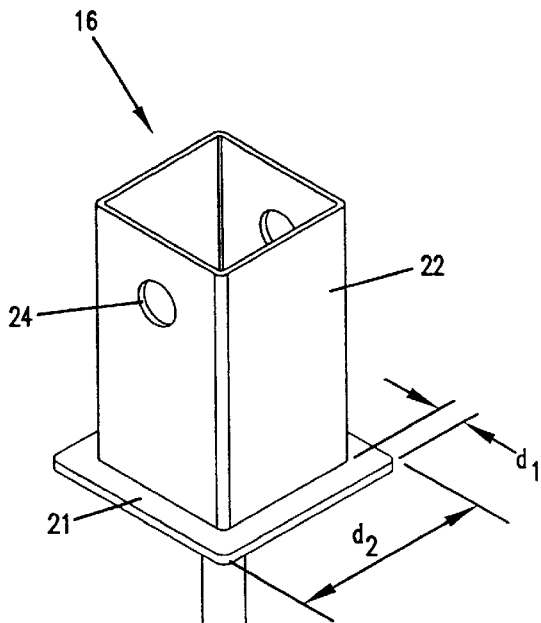
Figure 10C:
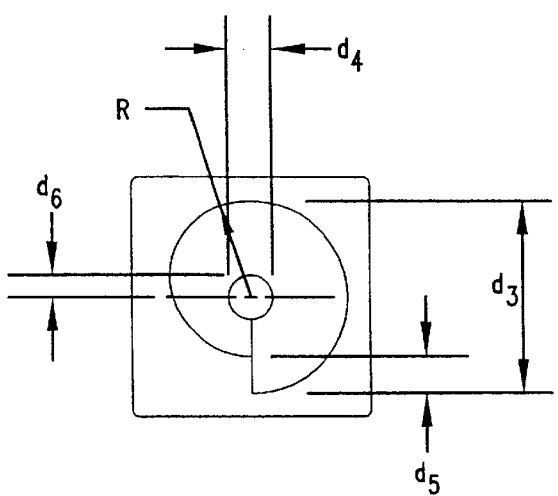

The details of an exemplary design of the ground anchor 16 are illustrated in FIGS. 10A–C. Between the bottom of the sleeve 22 and the shaft 26 is a plate 21. The plate 21 is designed to engage the ground when the anchor 16 is screwed into the ground, thereby providing stability to the post 12. As is evident from FIG. 10A, the plate 21 is preferably a square with sides having dimension $d_2$ so that the plate extends beyond the sides of the sleeve 22 a certain distance $d_1$ to provide the stabilizing effect. In one implementation, it has been found that a plate 21 having a dimension $d_2$ equalling about 3 inches, and a distance $d_1$ equalling about 0.5 inches, provides adequate stability. However, it is to be realized that other plate dimensions could be used as well.

To permit drainage of any moisture that may enter the post 12 or the sleeve 22, at least one, and preferably two or more, weep holes 23 are provided in the plate 21 as best seen in FIG. 10B. In addition, the auger 28 is designed to facilitate insertion into the ground. If the auger is too wide, it is difficult to screw the anchor into the ground. Therefore, the dimensions of the auger 28 are selected to facilitate insertion into the ground. By way of example, the auger 28 can have the following dimensions:

$d_3$—about 2.5 inches
$d_4$—about 0.5 inches
$d_5$—about 0.5 inches
$d_6$—about 0.25 inches
R—about 1.0 inch
about 0.666 threads per inch.

It is to be realized that the auger 28 can have other dimensions as well, without departing from the spirit and scope of the invention.

One embodiment of the fence strand assembly 14, best seen in FIG. 2, includes a housing 30 that is slidably connected to the post 12 to permit adjustment of the housing 30 along the length of the post 12. The housing 30 is preferably formed from injection molded plastic, such as polycarbonate, acrylonitrile butadiene styrene (ABS) or other engineering grade plastics. However, in certain constructions such as a non-electric version, the housing or portions thereof could be formed from a metal material if desired.

Disposed within the housing 30 in a cup-shaped depression 32 thereof (best seen in FIG. 4) is a roll of fence strand material 34. The fence strand material 34 is illustrated in the figures as being a tape, such as polytape. However, it is to be recognized that other fence strand materials, such as wire or rope, could be used as well. In addition, as will be described in more detail later in the description, the fence strand material 34 can be electrified to provide an electric fence system.

One end of the fence strand material 34 extends through a slot 36 formed in the side of the housing 30, while the opposite end of the fence strand material 34 is secured to a spindle 38. The spindle 38, best seen in FIG. 5, includes a plurality of slots 40 therein through which the end of the fence strand material 34 extends such that rotation of the spindle in the appropriate direction causes the fence strand material 34 to be wound onto the spindle. The bottom end of the spindle 38 forms a pivot 42 which fits through a hole provided in the bottom of the cup-shaped depression 32 (see FIG. 4), with the spindle secured in place by a locking clip 44 engaging with a slot 46 in the pivot 42.

A spool 48 is rotatably received at the top of the housing 30 and closes off the cup-shaped depression 32 so that the roll of fence strand material 34 is enclosed within the housing. The spool 48 and housing 30 prevent ingress of water, dirt and other contaminants to the roll of fence strand material 34 thereby increasing the reliability and operational life of the fence strand assembly 14. The spool 48 includes a hole therein that receives a correspondingly shaped head 50 on the spindle 38. As illustrated in the figures, the hole and head 50 are rectangular in shape, although it is to be realized that other shapes, such as triangular, pentagonal or the like, could be used.

Figure 3:
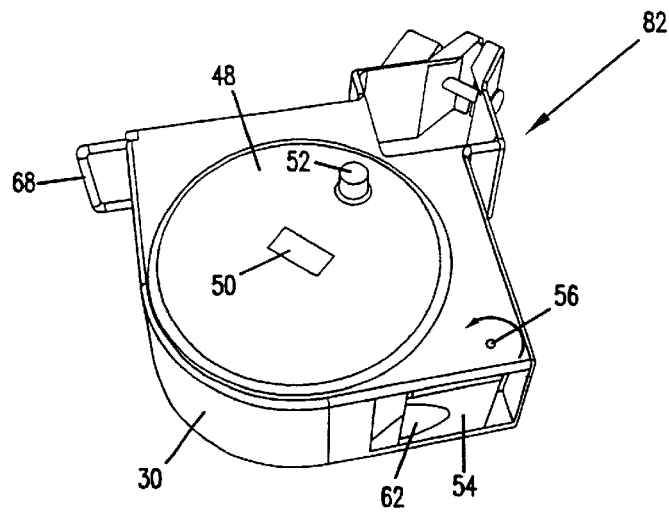
FIG. 3 is a top perspective view of the fence strand assembly used on the fence post assembly.

As best seen in FIG. 3, a crank handle 52 is disposed on, formed on, or otherwise connected to the top surface of the spool 48. The crank handle 52 is sized and shaped so as to permit manual or mechanical rotation of the spool 48. Rotation of the spool 48 causes rotation of the spindle 38, due to the fit of the head 50 into the spool hole. Thus, the spool 48 can be rotated via the crank handle 52, thereby rotating the spindle 38, to either pay-out (i.e. extend) the fence strand material 34 or wind-up (i.e. retract) the fence strand material 34.

With reference to FIGS. 3, 4, 6a and 6b, a locking mechanism is preferably provided in order to lock the fence strand material 34 and prevent further retraction/extension of the fence strand material 34. The lock mechanism includes a lock lever 54 that is pivotally secured to the housing 30 adjacent the slot 36 to control ingress/egress of the fence strand material 34 through the slot 36. The lock lever 54 includes a pair of pivot pins 56 that snap fit into suitably provided holes in the housing 30. A clamp bar 58 formed on the lock lever 54 forcibly clamps the fence strand material 34 against a wire finger 60 (see FIG. 4) and against the housing 30, when the lock lever 54 is in the position shown in FIGS. 3 and 4, and prevents further ingress/egress of the fence strand material 34 through the slot 36. A scalloped depression 62 is formed on the lock lever 54 to permit a persons finger(s) to get behind the lever to facilitate pivoting of the lever to an unlock position where the lever 54 projects from the outline of the housing 30.

Figure 4:
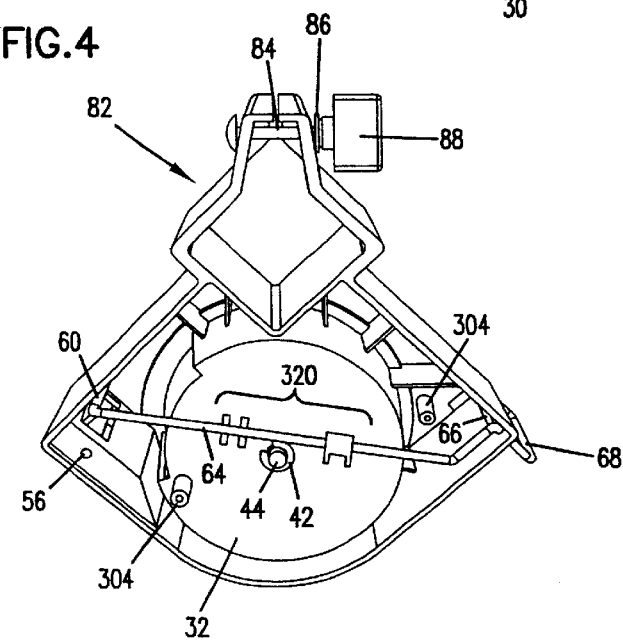
FIG. 4 is a bottom perspective view of the fence strand assembly.
Figure 5:
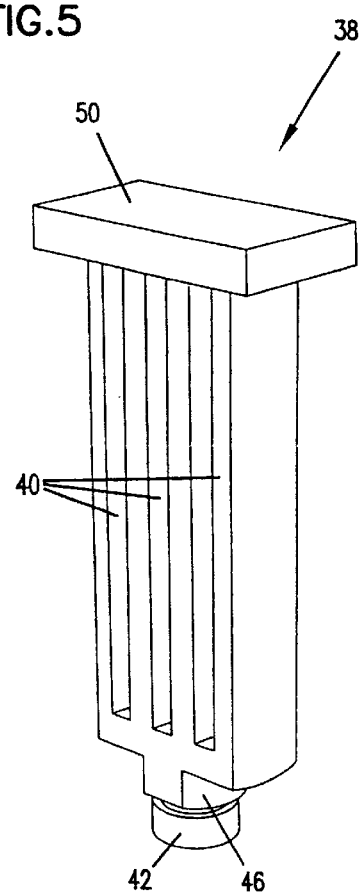
FIG. 5 illustrates the spindle used in the fence strand assembly.
Figure 6A:
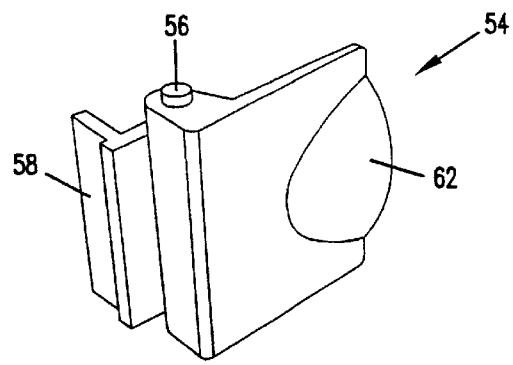
FIGS. 6a and 6b are perspective views of the lock lever associated with the fence strand assembly.
Figure 6B:
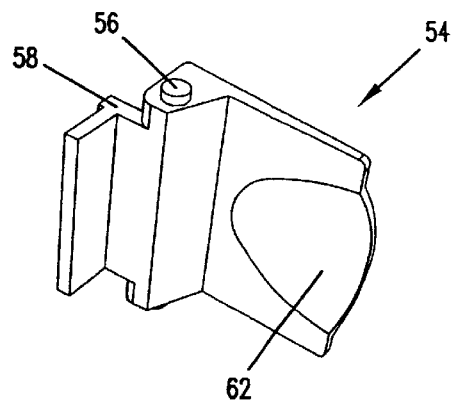

The wire finger 60 discussed above forms one end of a wire 64 that extends beneath the cup-shaped depression 32 as best seen in FIG. 4. The opposite end of the wire 64 extends through a slot 66 in the housing 30 and forms a loop 68. The loop 68 permits connection of fence strand material 34 to the housing 30.

Figure 7:
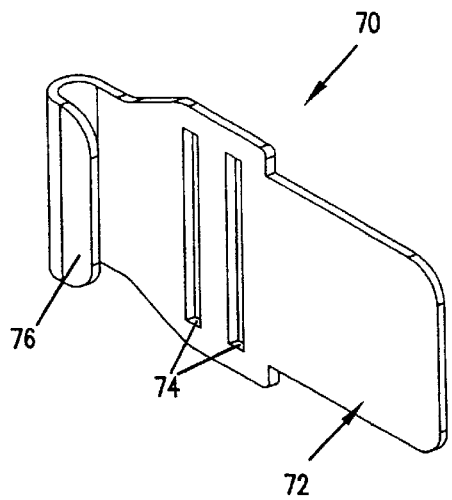
FIG. 7 is a perspective view of the hook disposed at the end of the extensible/retractable fence strand.
Figure 8:
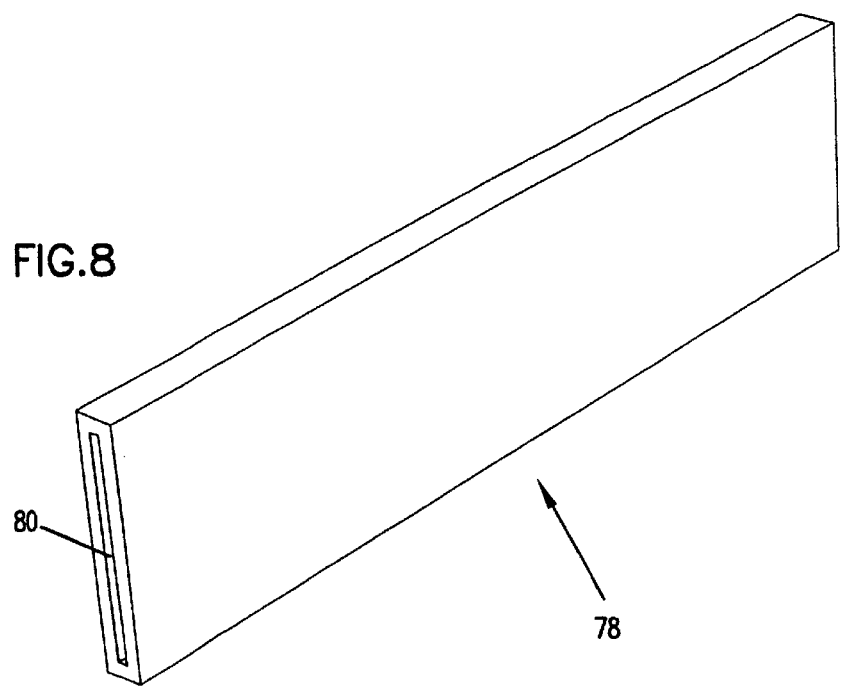
FIG. 8 is a perspective view of the handle that is connected to the extensible/retractable fence strand.

With reference now to FIGS. 1, 2 and 7, a strand connector 70 is connected to the end of the fence strand material 34. The strand connector 70 is preferably formed from a metal, such as stainless steel, or from a suitable plastic material. The connector 70 includes a buckle end 72 provided with a series of slots 74 through which the end of the fence strand material 34 is woven like a buckle so that the end of the fence strand material and the connector 70 are securely fastened. The opposite end of the connector 70 is formed into a hook 76 which is intended to engage the loop 68 to connect the end of the fence strand material 34 to the housing 30. The construction of the connector 70 is particularly suited for use with a tape, such as polytape, as the fence strand strand material. If the fence strand material 34 is slender, such as wire or rope, an alternate connector that is more suited for connection to a slender fence strand member, but also is able to connect to the housing, could be used.

In certain electric fencing systems, the connector 70 is preferably formed from metal so that electrical current is transferred from the fence strand material of one housing, through the connector 70 which connects to the loop 68 and into the wire 64 of an adjacent housing which carries the current across the adjacent housing to the finger 60 which in turn is in electrical contact with the fence strand material of the adjacent housing as a result of the clamping action provided by the lock lever 54. In this manner, electrical continuity can be maintained. When the fence is not electrified, the connector 70 can be either metal or plastic, and connects to the housing in the manner described or in any other suitable manner.

An optional gate handle 78 can be provided to facilitate handling of the end of the fence strand material 34. When used, the gate handle 78 is preferably formed of extruded polyvinylchloride (PVC) or other suitable plastic, and includes a channel 80 formed therethrough. The fence strand material 34 slides through the channel 80 and the buckle end 72 of the connector 70 wedges tightly into the channel 80. Thus, when used, the gate handle 78 provides a convenient handle by which a user can grasp and hold the end of the fence strand material 34.

As mentioned, the fence strand assembly 14 is adjustable along the length of the post 12. To accomplish the adjustment, the housing 30 is provided with a clamp assembly 82 that defines a shape, corresponding to the shape of the post 12, to permit clamping engagement of the housing 30 with the post 12. The clamp assembly 82 includes a bolt 84, a washer 86 and a knob 88 that cooperate in a manner known in the art to tighten and loosen the clamp assembly 82. Through appropriate rotation of the knob 88, the clamp assembly 82 is loosened and the fence strand assembly 14 can be adjusted along the length of the post 12 to the desired height. Rotation of the knob 88 in the opposite direction tightens the clamp assembly 82 and locks the fence strand assembly 14 in position. As shown in FIGS. 1 and 2, a cap 90 fits into and closes off the second end 20 of the post 12. The cap could also fit over the second end of the post.

Although a clamp assembly 82 has been described herein as permitting adjustment of the housing 30, other means permitting adjustment of the housing 30 could be utilized as well. For instance, an indexing system including a plurality of indexing holes along the length of the post 12 and an indexing pin inserted through a portion of the housing 30 and into a selected one of the indexing holes could be used.

As described previously, the fence post assembly 10 can be used to form an electric fence or enclosure. In an electric fence version, the fence strand material 34 must be constructed so as to permit conduction of electricity. When the fence strand material 34 is a tape, as illustrated in the figures, the type of tape used can be a bi-polar tape. Bi-polar tapes, which are generally known in the art, include a hot wire(s) and a ground wire extending along the length thereof.

A conducting wire, rather than tape, can be used as the fence strand material 34 if desired. A suitable type of wire is polywire. The use of wire permits a longer length of fence strand material 34 to be used on the spool 48, as compared to using tape. By way of example, for the same size spool, it has been found that the length of the wire can be up to about four time greater than the length of the tape.

As discussed above, in an electric fence version, electrical continuity is required between a fence strand that connects to the housing 30 and the fence strand that exits the housing 30. As discussed for FIGS. 1–8, the wire 64 is used to transfer electricity between fence strands. In this regard, the wire 64, which is made of metal or other conducting material, provides the necessary electrical path through the housing 30 which in this version is made from a non-conducting material such as plastic.

Figure 11:
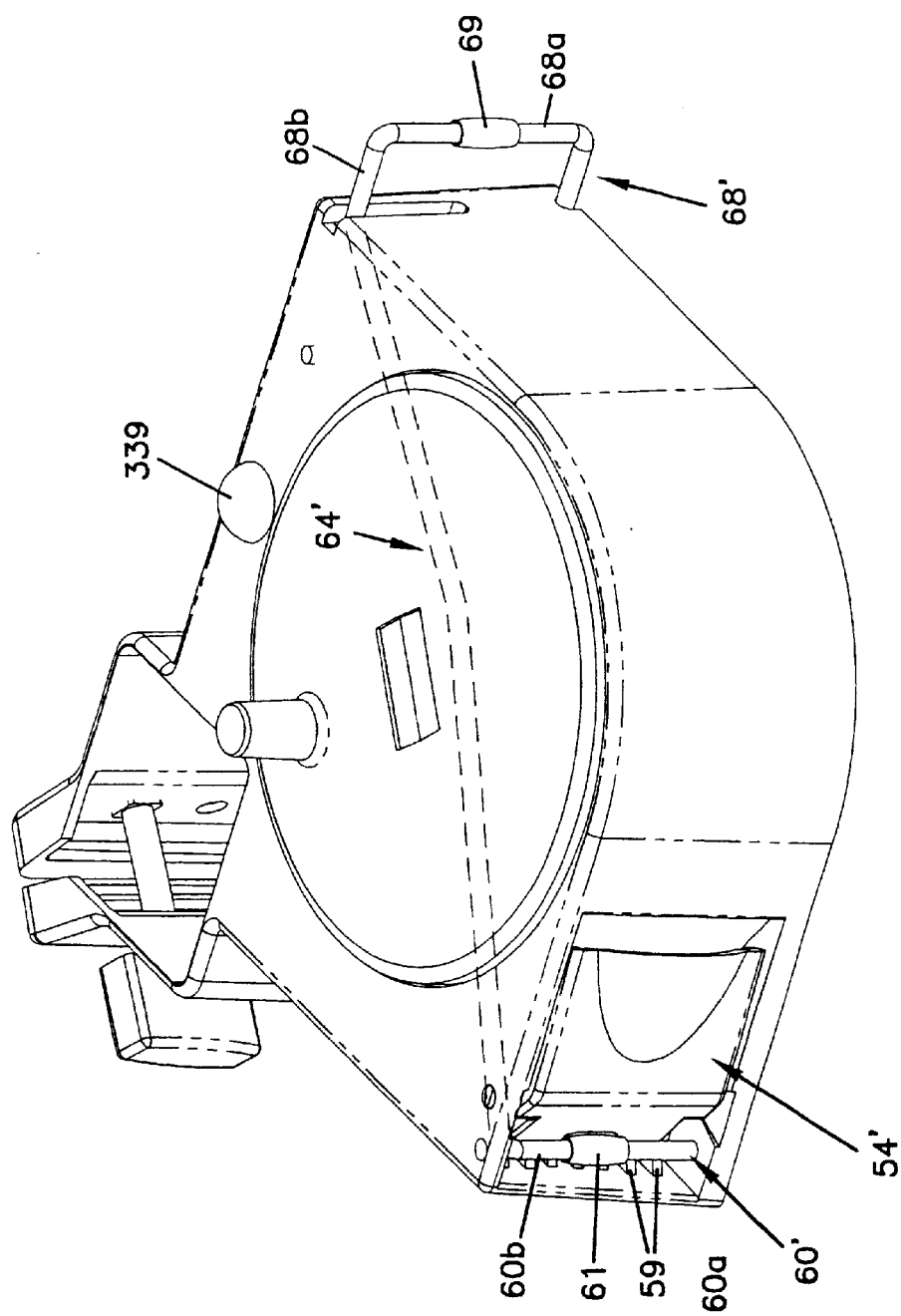
FIG. 11 illustrates a fence strand assembly for use in an electric fence system.
Figure 12:
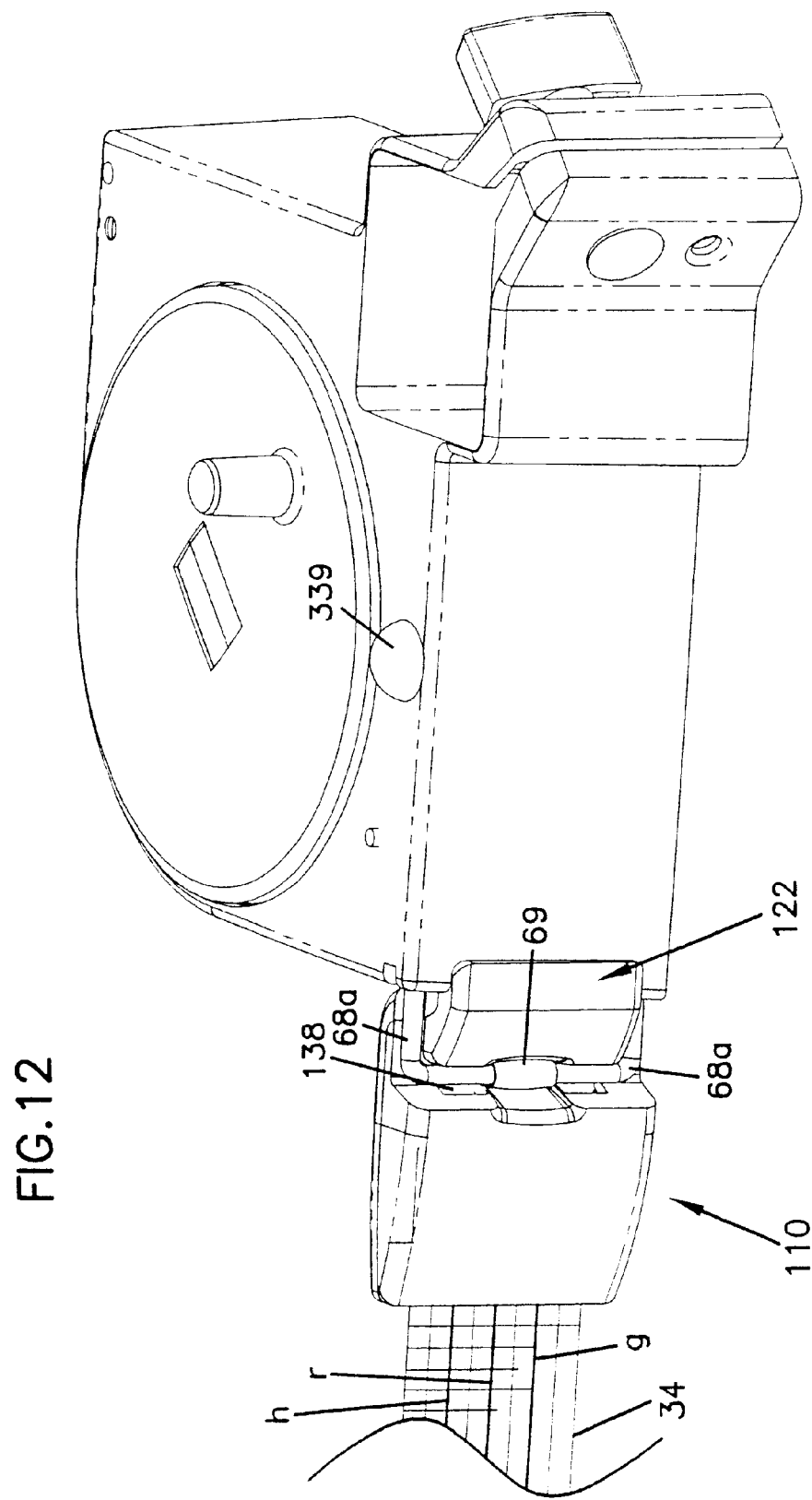
FIG. 12 illustrates a gate handle that is used to connect a bi-polar tape to an adjacent fence strand assembly.

FIGS. 11–13 illustrate a construction that is designed for use when the fence strand material 34 is a bi-polar tape. Because bi-polar tape has ground and hot wires, the wire 64' is constructed differently than the wire 64, in that the loop 68' of the wire 64' is provided with a plastic or other non-conducting piece 69 that divides the loop 68' into separate wires 68a, 68b. One wire, for example bottom wire 68a, is designed to electrically connect to the hot wire(s) in the bi-polar tape, and runs under the cup shaped depression as shown in FIG. 4. The other wire, for example top wire 68b, is designed to electrically connect to the ground wire(s) in the bi-polar tape, and runs through the housing, as shown in dashed lines in FIG. 11, without interfering with the rotation of the roll of bi-polar tape disposed in the housing. Likewise, the finger 60' is also provided with a non-conducting piece 61 that divides the finger 60' into separate wires 60a, 60b. The wire 60a is connected to the wire 68a via the portion that runs under the cup shaped depression, and the wire 60b is connected to the wire 68b as shown by the dashed lines in FIG. 11. Therefore, the wires 60a, 68a form a first electrical path through the housing while the wires 60b, 68b form a second electrical path. The non-conducting pieces 61, 69 separate the first and second electrical paths from each other.

As further illustrated in FIG. 11, the clamp bar 58 on the lock lever 54 is provided with serrated teeth 59. When the lock lever 54 is pivoted to the clamping position, the serrated teeth 59 press the bi-polar tape against the wires 60a, 60b. The serrated teeth 59 provide an improved electrical connection between the hot and ground wires in the tape exiting the housing and the wires 60a, 60b.

Figure 13B:
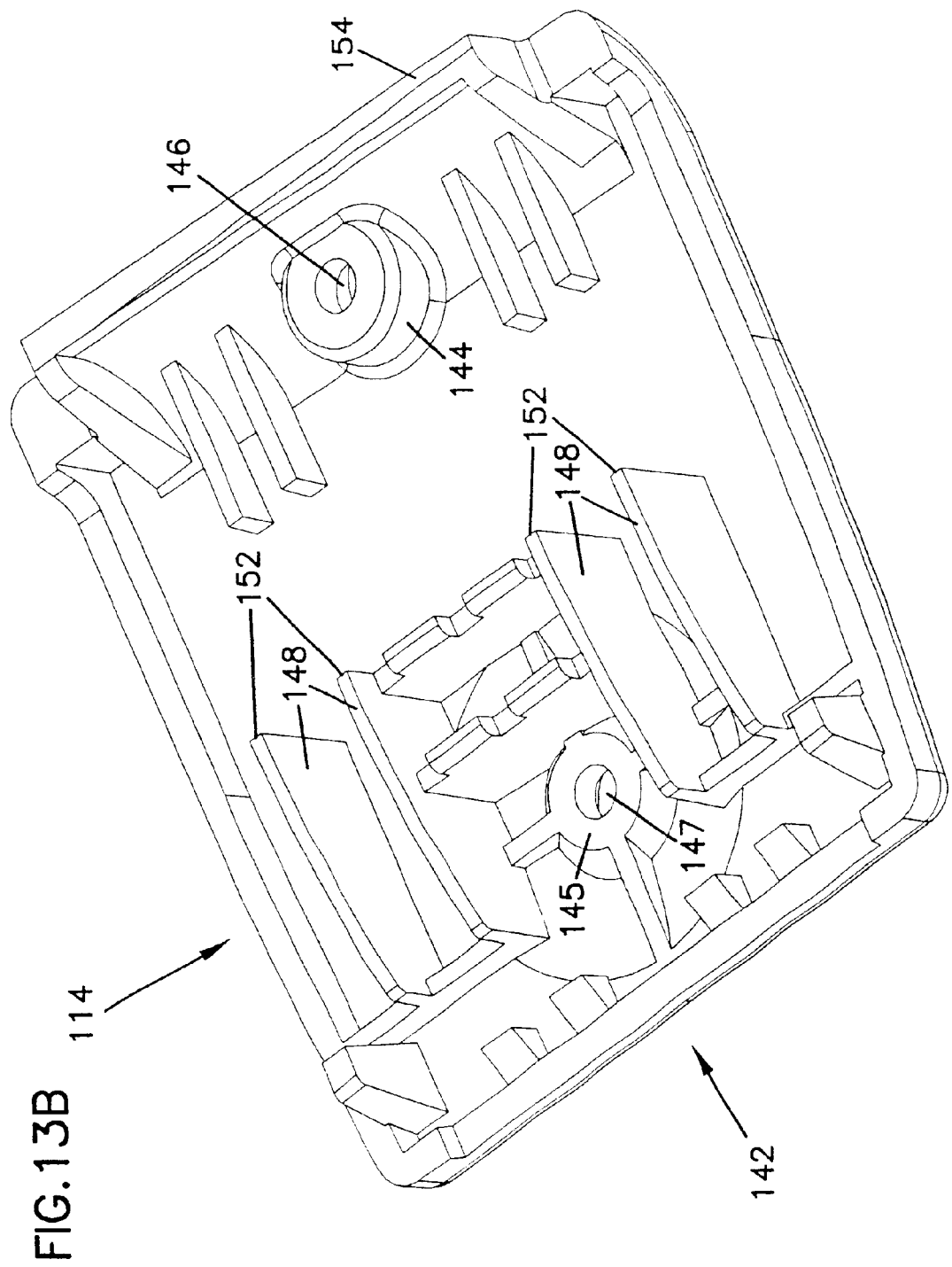

FIGS. 12, 13A and 13B illustrate a gate handle 110 that is used to connect the bi-polar tape to the housing 30 while maintaining electrical continuity across the housing, The gate handle 110 replaces the connector 70 and gate handle 78 arrangement described in FIGS. 1–8. A first clamping plate 112, shown in FIG. 13A, of the gate handle 110 cooperates with a second clamping plate 114, shown in FIG. 13B, to clamp the bi-polar tape 34 therebetween whereby the gate handle 110 is securely attached to the end of the tape 34, as well as providing for an electrical connection between the hot and ground wires of the bi-polar tape 34 and the hook 68' on the housing. Each clamping plate 112, 114 is formed from a non-conducting plastic material. The tape 34 is shown diagrammatically in FIG. 13A to illustrate its position relative to the plate 112.

With reference to FIG. 13A, the first clamping plate 112 includes a first end 116 adjacent which there is provided a pair of spaced holes 118a, 118b. Projecting from the interior surface of the plate 112 are two pairs of tapered ribs 120a, 120b. The ribs 120a, 120b generally increase in height as they extend from the first end 116 toward a second, connecting end 122 of the plate 112, with each rib including a relatively sharp, pointed tip 124. Between each pair of ribs 120a, 120b, a metal contact strip 126a, 126b extends. The contact strips 126a, 126b extend from adjacent the first end 116 of the plate 112, where the ends of the strips engage stops 128 projecting from the interior surface, through a pair of channels 130a, 130b formed in a trough 132, and toward the connecting end 122 where the opposite ends of the strips 126a, 126b contact stops 134. In addition, an internally threaded boss 136 projects from the interior surface of the plate 112 between the trough 132 and the connecting end 122 and between the stops 134.

With reference to FIG. 12 and 13A, the trough 132 forms a channel 138 that opens toward the exterior surface of the plate 112. The portion of each strip 126a, 126b that extends through the respective channels 130a, 130b is thus disposed within the channel 138 and is accessible from outside the gate handle 110. It is the portions of the strips 126a, 126b disposed within the channel 138 that are to contact the wires 68a, 68b when the gate handle 110 is connected to the housing.

With reference to FIG. 13B, the interior surface of the clamping plate 114 that in use faces the interior surface of the clamping plate 112 is visible. A pair of connecting legs 140a, 140b project from the interior surface of the plate 114 adjacent a first end 142 thereof. The legs 140a, 140b are sized to fit within the holes 118a, 118b, respectively, whereby the ends 116, 142 of the plates 112, 114 are engaged with each other.

In addition, a boss 144 having a through hole 146 projects from the interior surface of the plate 114 at a location that corresponds to the location of the boss 136 on the plate 112 when the two plates 112, 114 are secured together. The boss's 136, 144 cooperate with each other to form a means, along with the legs 140a, 140b and holes 118a, 118b, whereby the two plates 112, 114 are securely fastened together in a releasable manner. Preferably, a threaded screw (not illustrated) is used to secure the two plates, with the screw extending through the through hole 146 of the boss 144 and into threaded engagement with the boss 136. The screw is preferably inserted through the exterior side of the plate 114, and the boss 144 is preferably countersunk on the exterior side thereof so that the head of the screw is recessed into the gate handle 110.

Two pairs of ribs 148a, 148b project from the interior surface of the plate 114. The ribs 148a, 148b have a shape that is similar to the ribs 120a, 120b, and each rib also includes a relatively sharp, pointed tip 152. The positioning, size and spacing of the ribs 148a, 148b are such that when the plates 112, 114 are secured together, the ribs 148a are located between the two ribs 120a, and the ribs 148b are located between the two ribs 120b. When this occurs, the tape 34 is firmly pushed against the contact strips 126a, 126b, which in turn are pressed against the interior surface of the plate 112, thereby ensuring that electrial contact occurs between the tape's hot and ground wires and the contact strips. As an example, if the hot wire h and ground wire g of the tape are located as shown in FIG. 13A, the hot wire h will be pressed against the contact strip 126a by the ribs 148a, while the ground wire g will be pressed against the contact strip 126b by the ribs 148b. Further, the pointed tips 124, 152 engage with the tape 34 and prevent the tape 34 from being pulled from the gate handle 110.

The plate 114 further includes a flange 154 adjacent an end thereof opposite the end 142. The flange 154 cooperates with and is positioned closely adjacent to a wall 156 on the plate 112 when the plates 112, 114 are connected together in order to substantially close off the interior of the gate handle 110 from the exterior thereof.

Returning to FIG. 13A, it is seen that the plate 112 includes a lip 158 at the connecting end 122. In use, the interior surface of the lip 158 rests on one surface of the housing 30, while the surface formed by the flange 154 and wall 156 rest on another surface.

After the tape 34 is placed between the two plates 112, 114 and the plates are fastened together, the gate handle 110 is connected to the housing 30 in the following manner. As illustrated in FIG. 12, the connecting end 122 is inserted through the loop 68'. The gate handle 110 is then rotated so that the connecting end 122 engages with the corner of the housing 30. In particular, the interior surface of the lip 158 rests on one corner surface, while the surface formed by the flange 154 and wall 156 rest on another corner surface, thereby achieving a secure connection of the gate handle to the housing.

Further, rotation of the gate handle 110 disposes the loop 68' and the wires 68a, 68b thereof within the channel 138 of the trough 132, where the wires 68a, 68b contact the portions of the strips 126a, 126b disposed within the channel 138. Thus, because the hot and ground wires of the tape are in electrical contact with the contact strips 126a, 126b, the wires 68a, 68b of the loop 68' are in contact with the contact strips, the wires 60*a*, 60*b* are connected to the wires 68*a*, 68*b*, and the wires 60*a*, 60*b* are in electrical contact with the tape that exits the opposite side of the housing 30, electrical continuity is maintained between the tape and the tape that exits. Disconnection is achieved by rotating the gate handle 110 to an extent that permits the connection end 122 to be removed from the loop 68'.

With reference to FIG. 14, in the electric fence version, electricity can be provided by the use of one or more solar panels 150, either mounted on the fence post assembly 10 or provided as a stand alone structure. Alternatively, one or more batteries 160 provided on or in the fence post assembly 10 can be used to provide electrical power. Preferably, the batteries are used in combination with the solar panels, with the solar panels being used to recharge the batteries. A fence controller 170 is provided for controlling operation of the fence post assembly 10. The controller 170 can be mounted in a variety of locations, for example within the fence post 12 or on the exterior thereof, or it can be provided as a stand-alone unit.

Figure 9:
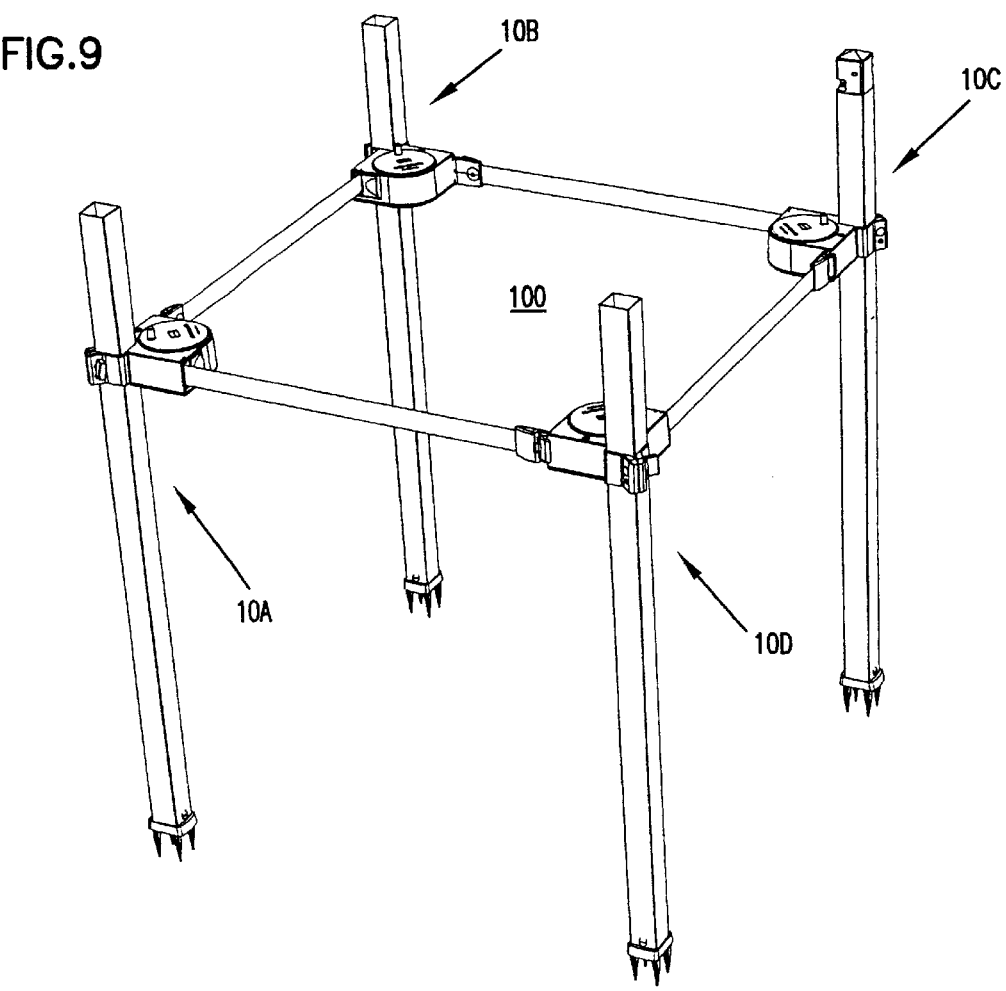
FIG. 9 illustrates a plurality of the fence post assemblies forming an enclosure.

FIG. 9 illustrates four fence post assemblies 10A–D (each of which is identical to fence post assembly 10) that are arranged to form an enclosure 100. An exemplary assembly procedure to form the enclosure 100 is as follows: the four fence post assemblies 10A–D are located at the corners of the enclosure that is to be formed. The anchors 16 are screwed into the ground, and the posts 12 are then attached to the anchors 16. The fence strand material 34 is then unwound from the roll of fence post assembly 10A by pulling on the end of the fence strand material and/or by rotating the spool 48 in the appropriate direction. The end of the fence strand material 34 is then connected to the housing on the fence post assembly 10B. A similar procedure is repeated for fence post assemblies 10B–D, with fence post assembly 10B connecting to fence post assembly 10C, fence post assembly 10C connecting to fence post assembly 10D, and fence post assembly 10D connecting to fence post assembly 10A. The housings are adjusted up or down along the posts as needed to provide the desired fence strand height. Although an exemplary procedure for forming the enclosure 100 has been described, other assembly procedures could be used as well.

It should be realized that when the enclosure shown in FIG. 9 is to be electrified, the electrical continuity between the fence strand material of one fence post assembly and the fence strand material of another fence post assembly is maintained, in one embodiment, by using the gate handle 110 illustrated in FIGS. 12, 13A, and 13B.

Instead of using four identical fence post assemblies 10A–D, a larger or smaller number of fence post assemblies could be used to form the enclosure. For instance, if sufficient quantity of fence strand material 34 is available on the roll, the enclosure could be formed by running the material 34 from the housing of one fence post assembly 10, around man-made objects such as fence posts that do not have fence strand material rolls and housings as described herein, or around natural objects such as trees, and back to the original fence post assembly where it would connect to the housing. This type of enclosure using a fence post assembly with a single housing is particularly useful when the fence strand material that is used is wire, as the length of wire that can be used on a spool is much greater than the length of tape that can be used on the spool.

In addition, one or more of the fence post assemblies could be used in combination with existing structure(s) to form the enclosure. For instance, one or more fence post assemblies 10 could be used in combination with a side wall of a building or vehicle structure to form the enclosure. Moreover, the end of the fence strand material 34 could be connected to the structure, rather than to an adjacent fence post assembly.

Each fence post assembly can be provided individually or as part of a kit along with one or more additional fence post assemblies. Moreover, the components of the fence post assembly 10, including the fence strand assembly 14, the fence post 12 and the ground anchor 16, can be provided as separate elements, thereby permitting replacement of one of the components in the event that a component should break, fail or otherwise need replacement.

To provide added stability to the fence post assembly 10, a guy wire 200 can extend from a portion of the fence post assembly 10 with the opposite end of the guy wire 200 anchored to the ground. As an example, as shown in FIG. 1, the guy wire 200 can connect to the clamp assembly 82.

It is to be understood that while certain embodiments of the present invention have been illustrated and described, the invention is not limited to the specific forms or arrangements of parts described and shown. Rather, the invention is defined by the following claims.

We claim:

1. A fence post assembly, comprising:

a post having first and second opposite ends;

a ground anchor connected to the post adjacent the first end for anchoring the post; and a fence strand assembly connected to the post, said fence strand assembly includes an extendable and retractable bi-polar tape that is electrically conductive, and said bi-polar tape includes an end, and a gate handle connected to the end of the bi-polar tape, the gate handle including means for maintaining electrical continuity between the bi-polar tape and an object to which the gate handle is attached; and means for providing electrical current to the electrically conductive bi-polar tape.

* * * * *